(12) United States Patent
Kobayashi et al.

(10) Patent No.: US 11,213,915 B2
(45) Date of Patent: Jan. 4, 2022

(54) JOINING METHOD

(71) Applicant: FUTABA INDUSTRIAL CO., LTD., Okazaki (JP)

(72) Inventors: Toru Kobayashi, Okazaki (JP); Koji Yamaguchi, Okazaki (JP)

(73) Assignee: FUTABA INDUSTRIAL CO., LTD., Okazaki (JP)

(*) Notice: Subject to any disclaimer, the term of this patent is extended or adjusted under 35 U.S.C. 154(b) by 382 days.

(21) Appl. No.: 16/258,876

(22) Filed: Jan. 28, 2019

(65) Prior Publication Data

US 2019/0255653 A1 Aug. 22, 2019

(30) Foreign Application Priority Data

Feb. 20, 2018 (JP) .............................. JP2018-027894

(51) Int. Cl.
*B23K 26/08* (2014.01)
*B23K 26/244* (2014.01)
(Continued)

(52) U.S. Cl.
CPC .......... *B23K 26/21* (2015.10); *B23K 26/0626* (2013.01); *B23K 26/082* (2015.10); (Continued)

(58) Field of Classification Search
CPC .............. B23K 26/0626; B23K 26/082; B23K 26/242; B23K 26/0884
See application file for complete search history.

(56) References Cited

U.S. PATENT DOCUMENTS 8,350,185 B2 * 1/2013 Lee ..................... B23K 26/244
219/121.64
8,941,031 B2 * 1/2015 Behmlander ........ B23K 26/082
219/136
(Continued)

FOREIGN PATENT DOCUMENTS

JP  2003183726 A  7/2003
JP  2005021977 A  1/2005
(Continued)

OTHER PUBLICATIONS

Second Office Action for Chinese Patent Application No. 201910119265.6, dated Mar. 12, 2021, 10 pages including English translation.
(Continued)

*Primary Examiner* — Dana Ross
*Assistant Examiner* — Lawrence H Samuels
(74) *Attorney, Agent, or Firm* — Withrow & Terranova, P.L.L.C.; Vincent K. Gustafson

(57) ABSTRACT

Provided is a welding method that can enhance joining quality between an upper plate and a lower plate. One aspect of the present disclosure is a joining method including joining the upper plate to the lower plate that is overlapped with the upper plate by applying energy to a top surface of the upper plate to thereby melt the upper plate and the lower plate together. A joining path designed to apply the energy to the top surface of the upper plate crosses an axis along a joining-travel direction and includes a turn-point. An amount of the energy includes a first energy applied in the vicinity of the turn-point and a second energy amount applied in an area other than the vicinity of the turn-point. The first energy amount is smaller than the second energy amount.

7 Claims, 6 Drawing Sheets

(51) Int. Cl.
    *B23K 26/21* (2014.01)
    *B29C 65/16* (2006.01)
    *B23K 26/06* (2014.01)
    *B23K 26/323* (2014.01)
    *B23K 26/32* (2014.01)
    *B23K 26/082* (2014.01)
    *B23K 1/005* (2006.01)
    *B23K 103/20* (2006.01)
    *B23K 101/00* (2006.01)
    *B23K 103/10* (2006.01)
    *B23K 101/18* (2006.01)
    *B23K 103/04* (2006.01)

(52) U.S. Cl.
    CPC ............ *B23K 26/244* (2015.10); *B23K 26/32* (2013.01); *B23K 26/323* (2015.10); *B29C 65/16* (2013.01); *B23K 1/005* (2013.01); *B23K 2101/006* (2018.08); *B23K 2101/185* (2018.08); *B23K 2103/04* (2018.08); *B23K 2103/10* (2018.08); *B23K 2103/20* (2018.08)

(56) References Cited

U.S. PATENT DOCUMENTS

| | | | |
|---|---|---|---|
| 9,067,278 B2* | 6/2015 | Mudd, II | B23K 26/082 |
| 10,857,624 B2* | 12/2020 | Hioki | B23K 26/242 |
| 10,875,121 B2* | 12/2020 | Roos | B23K 26/0626 |
| 2003/0217993 A1 | 11/2003 | Stol et al. | |
| 2008/0245777 A1* | 10/2008 | Cremerius | B23K 26/40 |
| | | | 219/121.64 |
| 2014/0054273 A1* | 2/2014 | Behmlander | B23K 28/02 |
| | | | 219/121.64 |
| 2014/0291304 A1* | 10/2014 | Mudd, II | B23K 26/32 |
| | | | 219/121.61 |
| 2016/0329542 A1* | 11/2016 | Tyler | H01M 50/528 |
| 2016/0332257 A1* | 11/2016 | Kawamoto | B23K 26/082 |
| 2017/0144249 A1 | 5/2017 | Fujiwara et al. | |
| 2018/0214983 A1* | 8/2018 | Yang | B23K 26/082 |
| 2018/0272466 A1* | 9/2018 | Roos | B23K 26/0884 |

FOREIGN PATENT DOCUMENTS

| | | | | |
|---|---|---|---|---|
| JP | 2005527383 A | 9/2005 | | |
| JP | 2015030018 A | 2/2015 | | |
| JP | 2017209700 A | 11/2017 | | |
| WO | 2008053915 A1 | 5/2008 | | |
| WO | 2015104762 A1 | 3/2017 | | |
| WO | 2015159514 A1 | 4/2017 | | |
| WO | 2017089126 A1 | 6/2017 | | |
| WO | WO-2017089126 A1 * | 6/2017 | ........... | B23K 26/082 |

OTHER PUBLICATIONS

First Office Action for Chinese Patent Application No. 201910119265.6, dated Aug. 3, 2020, 10 pages including English translation.
Notice of Reasons for Refusal for Japanese Patent Application No. 2018-027894, dated Feb. 12, 2020, 6 pages.
Notice of Reasons for Rejection for Chinese Patent Application No. 201910119265.6, dated Sep. 27, 2021, 11 pages.

* cited by examiner

JOINING METHOD

CROSS-REFERENCE TO RELATED APPLICATIONS

This application claims the benefit of Japanese Patent Application No. 2018-27894 filed on Feb. 20, 2018 with the Japan Patent Office, the entire disclosure of which is incorporated herein by reference.

BACKGROUND

The present disclosure relates to a joining method.

There has been known a method of mutually welding metal members by irradiating a laser light to the metal members to be welded (see, Published Japanese Translation of PCT International Publication for Patent Application No. 2005-527383). Such laser welding is applied in welding two overlapped metal plates.

SUMMARY

The aforementioned joining method externally applies energy to a surface of an upper plate to melt the upper plate exclusively, or to melt the upper plate and a lower plate together for joining them. Such a joining method increases an energy concentration level. As a result, molten metal may insufficiently fill clearance between two overlapping metal plates and therefore, the welding may not be performed favorably. Specifically, this may occur if one of the metal plates is thinner than the other metal plate is and the clearance between the two metal plates in an overlapped state is great.

In one aspect of the present disclosure, it is desirable to provide a welding method that can enhance joining quality between the upper plate and the lower plate.

One aspect of the present disclosure is a joining method comprising joining an upper plate to a lower plate that is overlapped with the upper plate by applying energy to a top surface of the upper plate to thereby melt the upper plate and the lower plate together. A joining path designed to apply the energy to the top surface of the upper plate crosses an axis along a joining-travel direction and includes a turn-point. An amount of the energy includes a first energy amount applied in the vicinity of the turn-point and a second energy amount applied in an area other than the vicinity of the turn-point. The first energy amount is smaller than the second energy amount.

Such a configuration can inhibit perforation in the turn-point in the welding path due to excessive penetration. As a result, even a thin metal plate can be inhibited from being defective, such as a welded portion being melted through and the welded portion lacking a throat thickness.

In one aspect of the present disclosure, the energy may be provided by a laser light. The upper plate may be joined to the lower plate by welding. In the joining, an irradiating position of the laser light in the top surface of the upper plate and the first energy amount and the second energy amount of the laser light applied to the top surface of the upper plate may be adjusted. Such a configuration enables the welding of the metal plates with ease and certainty.

In one aspect of the present disclosure, the joining path may be a welding path of weaving welding. The first energy amount applied in the vicinity of the turn-point in the welding path may be converted into a first heat-input amount and the second energy amount applied in the area other than the vicinity of the turn-point may be converted into a second heat-input amount. The first heat-input amount may be smaller than the second heat-input amount. With such a configuration, it is possible to inhibit excessive penetration in the turn-point with further certainty.

In one aspect of the present disclosure, a welding device may adjust an apply-position of the energy in the top surface of the upper plate and the first energy amount and the second energy amount applied to the top surface of the upper plate. Such a configuration can automatically adjust the respective energy amounts and can therefore enhance welding quality and welding productivity.

In one aspect of the present disclosure, the first energy amount may be set to be smaller than the second energy amount by control of a welding speed. With such a configuration, the first and second energy amounts can be adjusted with ease and certainty.

In one aspect of the present disclosure, the first energy amount may be set to be smaller than the second energy amount by focus-control of the laser light. With such a configuration, the first and the second energy amounts can also be adjusted with ease and certainty.

BRIEF DESCRIPTION OF THE DRAWINGS

An embodiment of the present disclosure will be described hereinafter by way of example with reference to the accompanying drawings, in which.

DETAILED DESCRIPTION OF THE PREFERRED EMBODIMENTS

1. First Embodiment

[1-1 Configuration]

A joining method of the present embodiment comprises joining an upper plate to a lower plate that is overlapped with the upper plate by applying energy to a top surface of the upper plate, to thereby melt the upper plate and the lower plate together.

In the present embodiment, the upper plate is joined to the lower plate by welding. The upper plate and the lower plate are made of metal. In other words, the joining method of the present embodiment welds two metal plates together.

Figure 1:
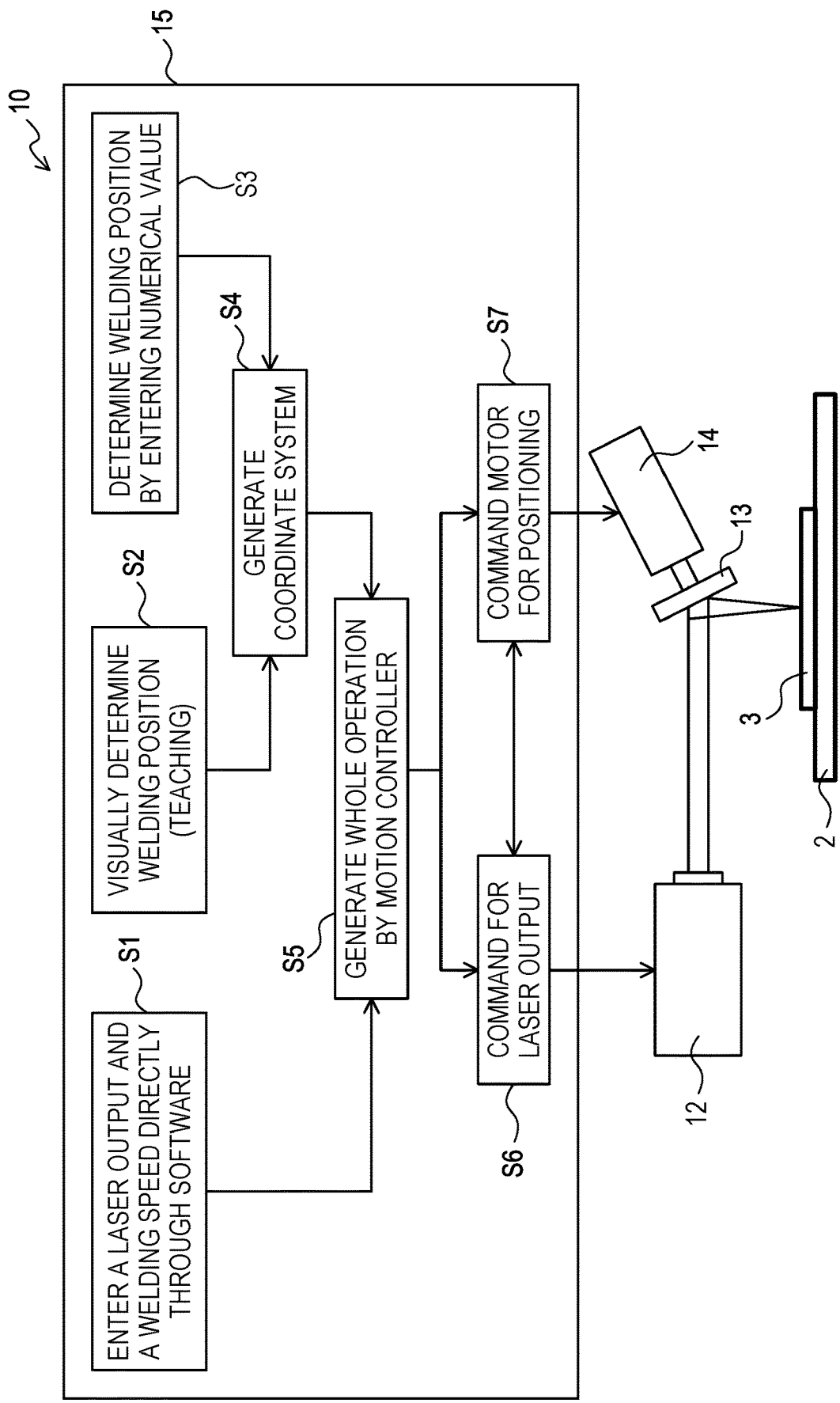
FIG. 1 is a flow diagram and a block diagram of a joining method of an embodiment.

The joining method of the present embodiment performs welding by using a welding device 10 shown in FIG. 1.

The welding device 10 comprises an oscillator 12, a mirror 13, a motor 14, and a controller 15.

The oscillator 12 generates a laser light to apply the energy on a surface of an upper plate 3 (in other words, a top surface of a base material), which is overlapped onto a lower plate 2. As a supply-source of the laser light, carbon dioxide gas ($CO_2$) may be used for example. The mirror 13 changes a path of the laser light generated by the oscillator 12 and irradiates the laser light to the surface of the upper plate 3. The motor 14 is mounted to the mirror 13 and is configured to change an angle of the mirror 13.

The controller 15 adjusts an irradiating position of the laser light and an energy amount of the laser light applied to the surface of the upper plate 3. Specifically, the controller 15 changes the angle of the mirror 13 by the motor 14, to thereby adjust the irradiating position of the laser light. Additionally, the controller 15 changes an output of the oscillator 12, to thereby adjust the energy amount of the laser light.

Hereinafter, a description is given to a specific adjustment procedure.

As shown in FIG. 1, an operator first inputs a laser output and a welding speed directly into the welding device 10 through a software (step S1).

Concurrently with step S1, the operator visually determines a welding position and instructs the welding device 10 on the welding position so that the welding position is automatically generated in the software (step S2). Further, the operator determines the welding position by entering a numerical value into the welding device 10 (step S3).

The controller 15 generates a coordinate system based on respective inputs in the steps S2 and S3 (step S4). Here, either one of the steps S2 or S3 may be performed.

The controller 15 generates a whole operation pattern of the welding device 10 by a motion controller based on inputs in the step 1 (in other words, the laser output and the welding speed) and the coordinate system generated in the step 4 (step S5).

The controller 15 commands the oscillator 12 to output the laser light based on the operation pattern generated in the step S5 (step S6). Further, the controller 15 supplies a machining head with the irradiating position (step S7). The machining head is formed with the mirror 13 and the motor 14. Here, the steps S6 and S7 are performed interlockingly.

<Welded Structure>

Figure 2A:
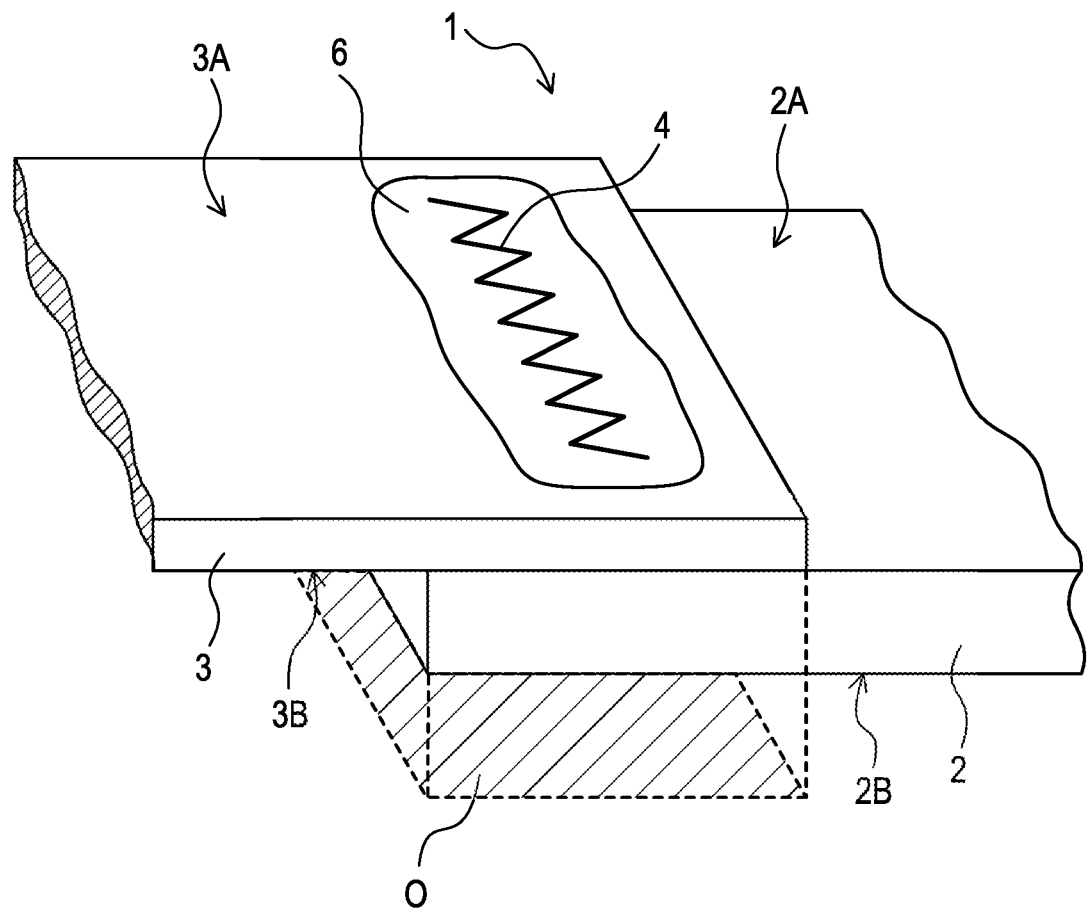
FIG. 2A is a schematic perspective view of a welded portion according to the joining method of FIG. 1.
Figure 2B:
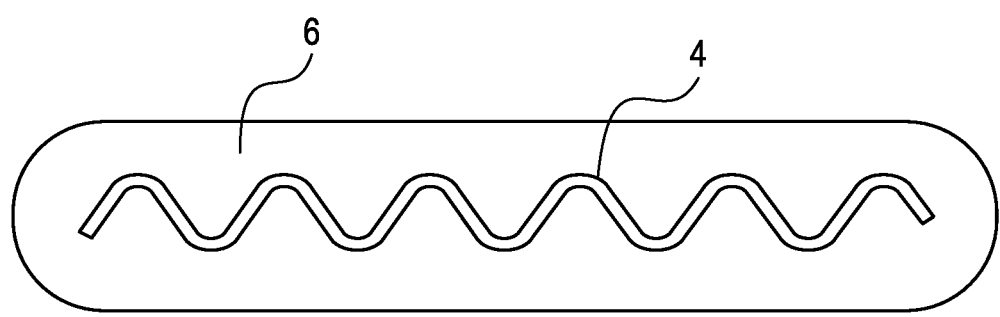
FIG. 2B is a schematic view of the welded portion according to the joining method of FIG. 1.

The welding performed by the welding device 10 provides a welded structure 1 shown in FIGS. 2A and 2B. The welded structure 1 is formed such that two metal plates are mutually welded in a thickness direction. The welded structure 1 comprises the lower plate 2, the upper plate 3, a main welded portion 4, and a weld bead 6.

The welded structure 1 may be used in any application that can mutually weld metal plates. For example, the welded structure 1 can be suitably used for a bracket-attachment structure of a vehicle component such as an instrument panel reinforcement.

The lower plate 2 may be made of a material, such as iron, ferro-alloy such as steel, aluminum, or aluminum alloy. The lower plate 2 may have any thickness. A material of the upper plate 3 includes those exemplified for the material of the lower plate 2. The upper plate 3 and the lower plate 2 may be made of the same material or different materials.

As shown in FIG. 2A, the lower plate 2 includes a surface 2A (top surface) and a surface 2B (bottom surface). A portion of the upper plate 3 is overlapped onto the surface 2A of the lower plate 2 in an overlapping area O between the upper plate 2 and the lower plate 3. The upper plate 3 is a thin plate having an average thickness of less than or equal to 1 mm in the overlapping area O. Here, the upper plate 3 may be entirely overlapped onto the lower plate 2. Further, the upper plate 3 may have an average thickness of greater than 1 mm in a non-overlapping area.

The main welded portion 4 is a part of a welded portion. In the main welded portion 4, metal that forms the lower plate 2 and the upper plate 3 is melted by heat-input derived from the laser light and is then solidified. The main welded portion 4 is provided with the weld bead 6 therearound. The main welded portion 4 forms a welding path of weaving welding.

Figure 3:
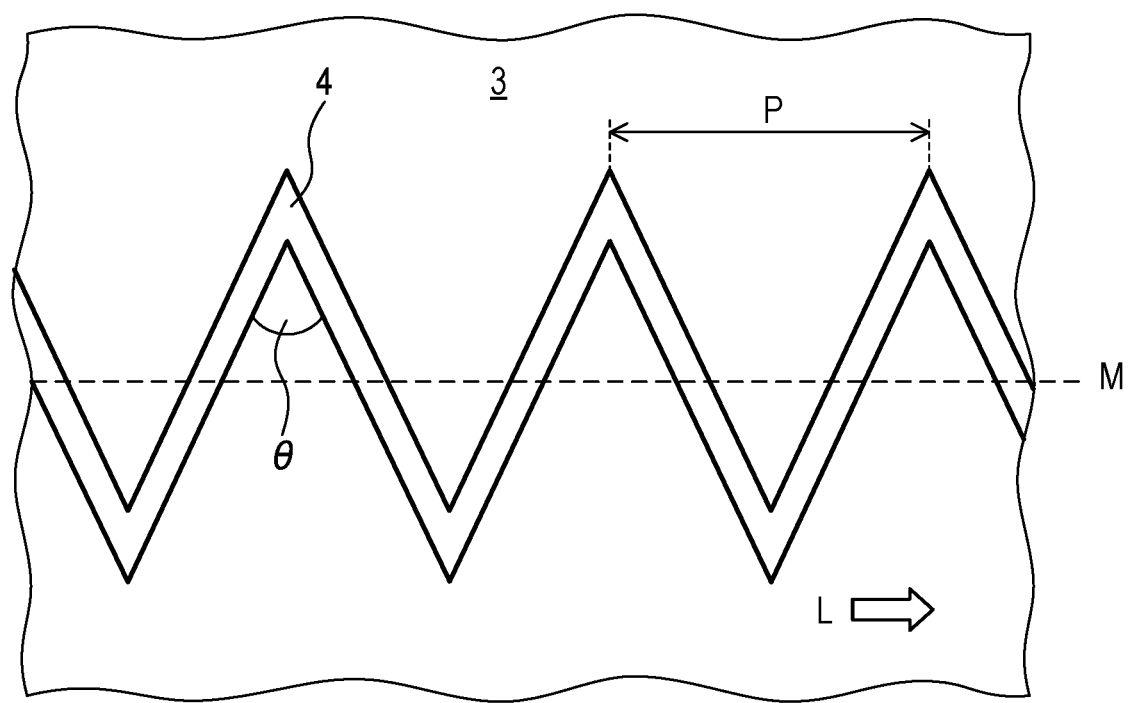
FIG. 3 is a schematic view of a welding path.

As shown in FIG. 3, in a plan view, the main welded portion 4 is configured to make a turn across the center line M in directions that cross an axis along a welding-travel direction L (joining-travel direction), which is in parallel to the center line M. In other words, the welding path crosses the axis along the joining-travel direction L and includes turn-points.

In the present embodiment, the main welded portion 4 is shaped into a series of triangular wave in the plan view. In the plan view, the main welded portion 4 may be a series of triangular wave in which a triangle edge is formed to make a smooth turn or a series of sine wave.

The main welded portion 4 is formed by irradiating the laser light to a surface 3A of the upper plate 3 in a weaving manner with respect to the axis along the welding-travel direction. The surface 3A is a top surface of the upper plate 3 shown in FIG. 2A that is situated opposite to the lower plate 2.

In the plan view, the main welded portion 4 includes a weaving distance P, which is a turn-distance (in other words, a distance between adjacent two turn-points in the welding-travel direction L). The weaving distance P is determined based on a plate thickness of metal to be joined or accuracy of clearance between the metal plates to be joined, for example.

Preferably, the distance P is less than or equal to 1 mm if the joining is performed on metal plates, each of which has a thickness of about 1 mm. There may be a rick of insufficient welding if the distance P is too great, which consequently enlarges the clearance between the metal plates in the main welded portion 4 in the welding-travel direction L. Further, each of the turn-points of the main welded portion 4 has a turn-angle θ in the plan view. The turn-angle θ is determined in accordance with input of a position coordinate, which is performed in light of heat-input condition to the metal plates and in consideration of the welding speed.

Figure 4A:
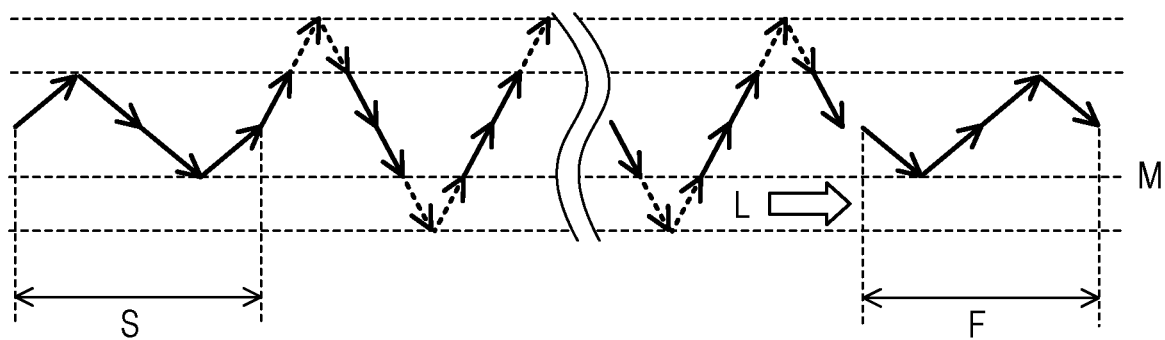
FIG. 4A is an explanatory diagram of a welding condition.

In addition, the welding path includes a weld-start portion (leading-end) S and a weld-finish portion (rear-end) F. As shown in FIG. 4A, in the present embodiment, the leading-end S and the rear-end F each have a smaller amplitude (in other words, a distance from the center line M to the turn-point) than an amplitude of a portion of the welding path other than the leading and rear ends. As a result, the welding path is formed such that a targeted weaving amplitude is smoothly made in series. Therefore, it is possible to enhance quality of both ends of the welding.

<Adjustment on Energy Amount>

In the present embodiment, the energy amount includes a first energy amount applied in the vicinity of the turn-point and a second energy amount applied in an area other than the vicinity of the turn-point. The welding device 10 controls the welding speed, so that the first energy amount is set to be smaller than the second energy amount. In other words, the welding speed in the area other than the vicinity of the turn-point is faster than the welding speed in the vicinity of the turn-point.

Figure 4B:
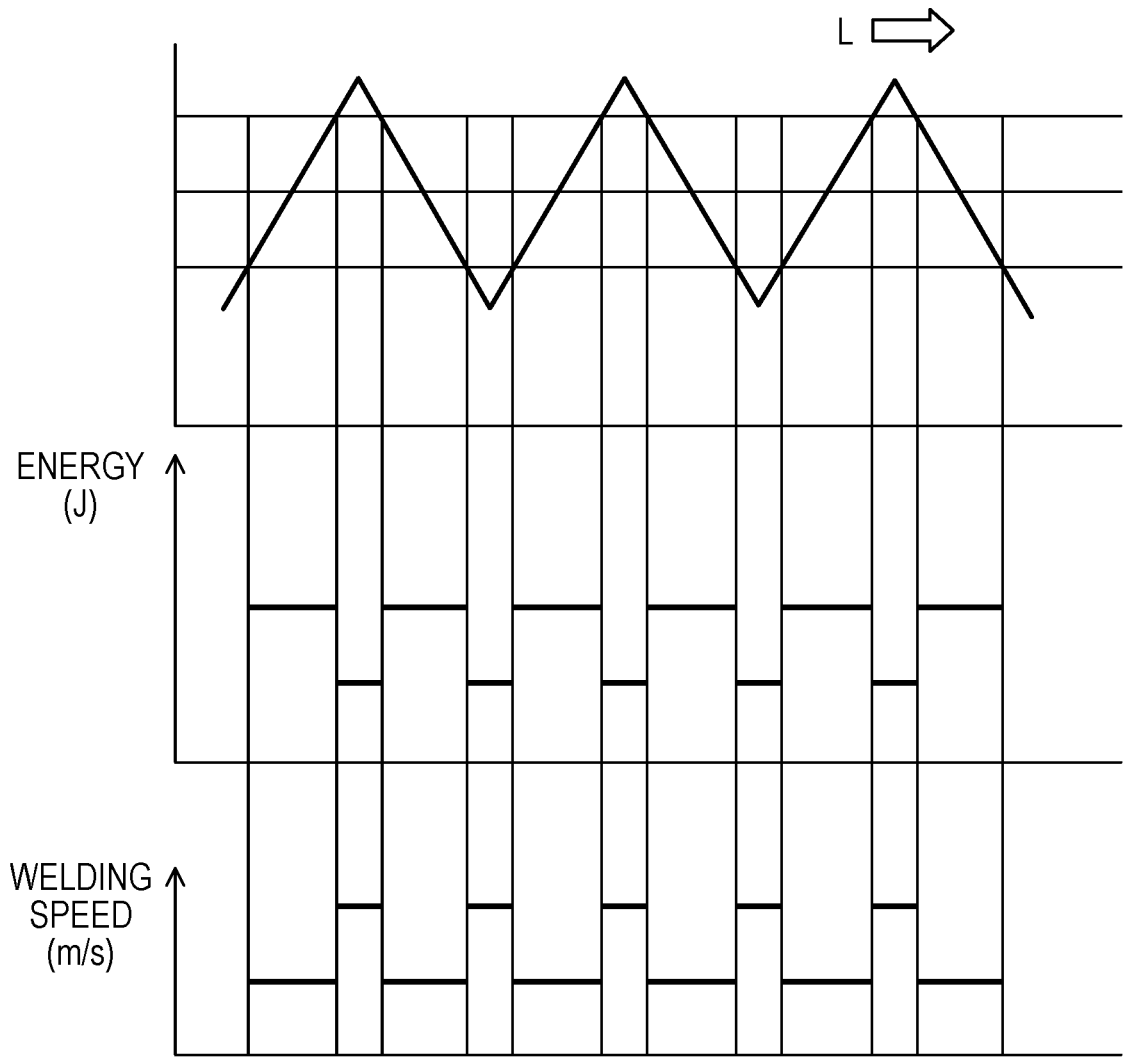
FIG. 4B is a schematic view showing a relationship between a welding-travel direction and an energy level.

As a result, the first energy amount applied in the vicinity of the turn-point in the welding path is smaller than the second energy amount applied in the area other than the vicinity of the turn-point, as shown in FIG. 4B.

Specifically, the first energy amount is converted into a first heat-input amount and the second energy amount is converted into a second heat-input amount. The first heat-input amount is set to be smaller than the second heat-input amount.

Figure 5:
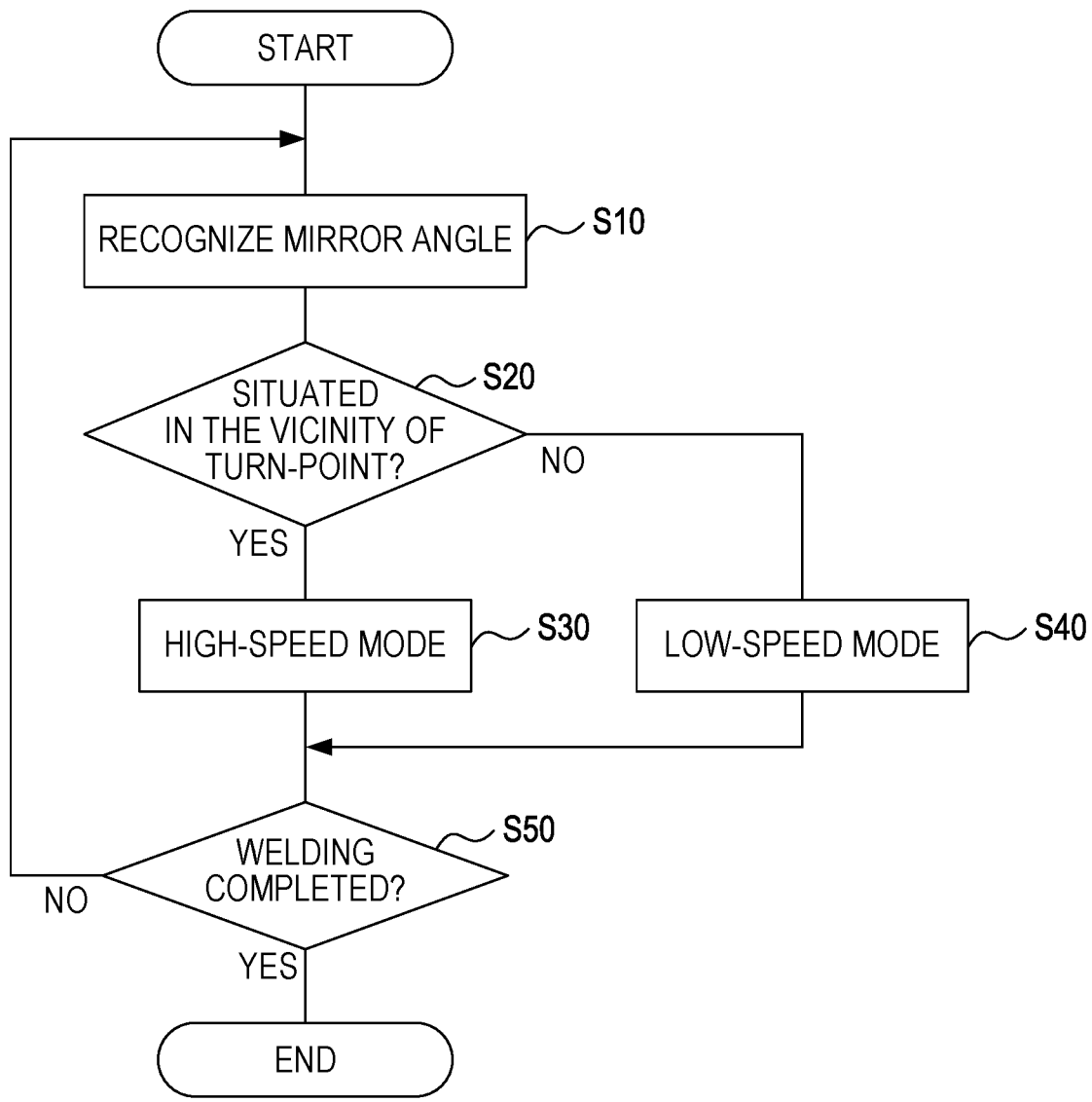
FIG. 5 is a flow diagram of an adjusting method of the welding condition.

A description is given to a specific process of adjusting the energy amount. As shown in FIG. 5, the controller 15 first recognizes a present irradiating position (in other words, the mirror angle) (step S10). Then, the controller 15 identifies an area of the irradiating position and determines whether the irradiating position is situated in the vicinity of the turn-point (step S20).

If the present irradiating position is situated in the vicinity of the turn-point (step S20: YES), the controller 15 executes a command to switch the welding speed into a high-speed mode or to maintain the high-speed mode (step S30).

In contrast, if the irradiating position is situated in the area other than the vicinity of the turn-point (step S20: NO), the controller 15 executes a command to switch the welding speed into a low-speed mode or to maintain the low-speed mode (step S40).

The controller 15 repeats controlling the welding speed until the welding is completed, in other words, until the irradiating position reaches the weld-finish portion F (step S50).

<Section of Welded Structure>

Figure 6:
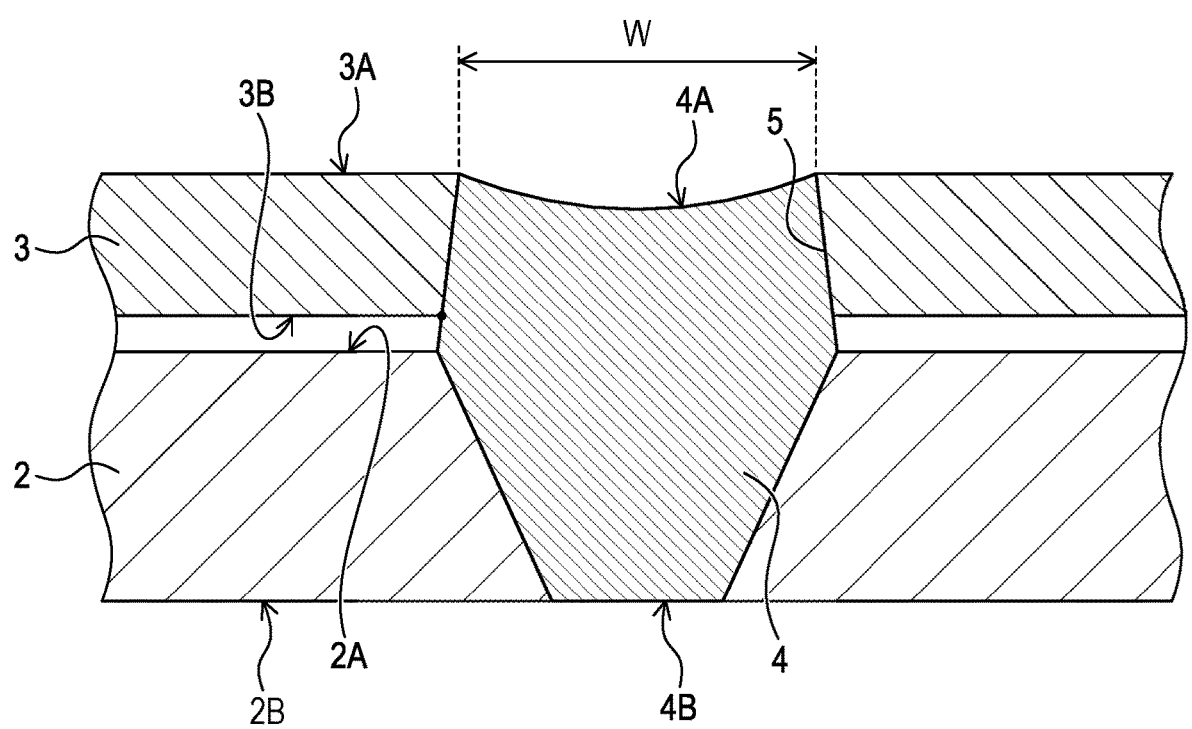
FIG. 6 is a schematic sectional view of the welded portion.

FIG. 6 shows a section of the welded structure 1 obtained by the joining method of the present embodiment.

In the welded structure 1 of FIG. 6, the main welded portion 4 is filled in a welded metal portion 5 formed by the laser light. The main welded portion 4 eliminates a space (in other words, a blowhole) therein.

The welded metal portion 5 penetrates through the upper plate 3. Also, the welded metal portion 5 reaches inside of the lower plate 2 and the surface 2 B that is situated opposite to the upper plate 3. Specifically, the welded metal portion 5 consists of an inner surface of the upper plate 3 and an inner surface of the lower plate 2. The upper plate 3 is joined to the lower plate 2 in the thickness direction via the main welded portion 4, which is joined to the inner surface of the upper plate 3 and to the inner surface the lower plate 2.

The surface 3A (in other words, a welding surface) of the upper plate 3 situated opposite to the lower plate 2 is continuous with an exposed surface 4A of the main welded portion 4 in the upper plate 3. Specifically, the section of the welded structure 1 cut along an axis perpendicular to a longitudinal axis of the main welded portion 4 (in other words, the welding-travel direction) L is formed such that the upper plate 3 and the main welded portion 4 eliminate discontinuity therebetween in the thickness direction in their joined portion. Here, as shown in FIG. 3, the longitudinal axis L of the main welded portion 4 corresponds to a weave-travel direction (in other words, a direction in parallel to a line running through the center of each weave).

As shown in FIG. 6, the exposed surface 4A of the main welded portion 4 is curved in a concave manner toward the center of the welded metal portion 5. In other words, the exposed surface 4A bridges over two ends of the surface 3A of the upper plate 3 that are separated by the welded metal portion 5, and smoothly joins the two ends to each other.

Further, the main welded portion 4 situated in the upper plate 3 is inwardly widened from the surface 3A of the upper plate 3 in the thickness direction (in other words, toward the lower plate 2). However, the main welded portion 4 in the upper plate 3 may not be widened.

Additionally, the main welded portion 4 situated in the lower plate 2 is outwardly tapered in width from the surface 2A of the lower plate 2 in the thickness direction (in other words, toward a direction departing from the upper plate 3).

Specifically, a width of a bottom surface 4B of the main welded portion 4 is smaller than a width of the exposed surface 4A of the main welded portion 4 in the upper plate 3, the respective widths extending along an axis perpendicular to the thickness direction. Here, the bottom surface 4B is exposed on the lower plate 2.

The width W of the exposed surface 4A of the main welded portion 4 can be set to a few millimeters, the width W being perpendicular to the longitudinal axis L of the main welded portion 4 and to the thickness direction of the upper plate 3.

As shown in FIG. 6, a surface 3B (bottom surface) of the upper plate 3, which faces the lower plate 2, and the surface 2A of the lower plate 2 include a clearance in an overlapping direction therebetween. There may be a risk of insufficient welding strength if the clearance is great. However, the clearance may not necessarily be included between the upper plate 3 and the lower plate 2.

[1-2. Effects]

Accordingly, the above-detailed embodiment provides the following effects.

(1a) It is possible to inhibit perforation in the turn-point in the welding path that is caused due to excessive penetration. As a result, even a thin metal plate can be inhibited from being defective, such as being melted through due to excessive heat-input into a portion to be welded, and lacking a throat thickness of the welded portion.

(1b) In the present embodiment, the first and second heat-input amounts converted from the first and second energy amounts, respectively, are adjusted in accordance with a position of the welding path. As a result, heat is input uniformly throughout the welding path, which therefore enables reduction of the excessive penetration in the turn-point with further certainty.

(1c) The welding device 10 adjusts an apply-position of the energy in the top surface of the upper plate and the energy amount applied to the top surface of the upper plate 3. This can therefore enhance joining quality and joining productivity.

(1d) The welding device 10 controls the welding speed, to thereby set the first energy amount applied in the vicinity of the turn-point to be smaller than the second energy amount applied in the area other than the vicinity of the turn-point with ease and certainty.

2. Other Embodiments

Accordingly, the embodiment of the present disclosure has been described. However, the present disclosure is not limited to the above-described embodiment and can be variously modified.

(2a) In the joining method of the above-described embodiment, the laser output or focus of the laser light focus may be controlled in replace of or in combination of control on the welding speed, to thereby set the first energy amount applied in the vicinity of the turn-point to be smaller than the second energy amount applied in the area other than the vicinity of the turn-point.

(2b) In the joining method of the above-described embodiment, the upper plate 3 and the lower plate 2 may be joined to each other by a method other than the welding.

(2c) A function achieved by one element in the aforementioned embodiment may be divided by two or more elements; and a function achieved by two or more elements may be combined by one element. Additionally, a part of the configuration of the aforementioned embodiment may be omitted. At least a part of the configuration of the aforementioned embodiment may be added to or replaced with the configuration of the aforementioned other embodiment. It should be noted that any and all modes that are encompassed in the technical ideas defined by the language in the scope of the claims are embodiments of the present disclosure.

What is claimed is:

1. A joining method comprising:
    joining an upper plate to a lower plate that is overlapped with the upper plate by applying energy to a top surface of the upper plate to thereby melt the upper plate and the lower plate together,
    wherein a joining path designed to apply the energy to the top surface of the upper plate includes multiple turn-points separated by intermediate joining path segments that cross an axis along a joining-travel direction that embodies a center line of joining, with each turn-point being non-overlapping with the center line of joining,
    wherein the applying of energy to the top surface of the upper plate comprises applying a first energy amount to the top surface of the upper plate in the vicinity of each turn-point, and comprises applying a second energy amount to the top surface of the upper plate along the intermediate joining path segments in areas other than in the vicinity of each turn-point;
    wherein the first energy amount is smaller than the second energy amount;
    wherein the first energy amount is substantially equal for each turn point; and
    wherein the second energy amount is substantially equal for each intermediate joining path segment.

2. The joining method according to claim 1,
    wherein the energy applied to the top surface of the upper plate is provided by a laser light,
    wherein the upper plate is joined to the lower plate by welding, and
    wherein, in the joining, an irradiating position of the laser light on the top surface of the upper plate is adjusted, and the first energy amount and the second energy amount of the laser light applied to the top surface of the upper plate are adjusted.

3. The joining method according to claim 2,
    wherein the joining path is a welding path of weaving welding,
    wherein the first energy amount applied in the vicinity of the turn-point in the welding path is converted into a first heat-input amount and the second energy amount applied in the area other than the vicinity of the turn-point is converted into a second heat-input amount, and
    wherein the first heat-input amount is smaller than the second heat-input amount.

4. The joining method according to claim 1,
    wherein a welding device adjusts a position of application of the energy on the top surface of the upper plate, and adjusts the first energy amount and the second energy amount applied to the top surface of the upper plate.

5. The joining method according to claim 2,
    wherein the first energy amount is set to be smaller than the second energy amount by control of a welding speed.

6. The joining method according to claim 2,
    wherein the first energy amount is set to be smaller than the second energy amount by focus-control of the laser light.

7. The joining method according to claim 1,
    wherein a weld-start portion and a weld-finish portion of the joining path each have a smaller amplitude of oscillation than an amplitude of oscillation of a portion of the joining path other than the weld-start portion and the weld-finish portion.

* * * * *